(12) United States Patent
Rintanen

(10) Patent No.: US 8,253,623 B2
(45) Date of Patent: Aug. 28, 2012

(54) SYSTEM AND METHOD FOR POSITIONING A GPS DEVICE

(75) Inventor: Kari Rintanen, Espoo (FI)

(73) Assignee: Konecranes Finland Oy, Hyvinkaa (FI)

( * ) Notice: Subject to any disclaimer, the term of this patent is extended or adjusted under 35 U.S.C. 154(b) by 151 days.

(21) Appl. No.: 12/304,260

(22) PCT Filed: May 8, 2007

(86) PCT No.: PCT/FI2007/050258
§ 371 (c)(1),
(2), (4) Date: Dec. 10, 2008

(87) PCT Pub. No.: WO2007/138158
PCT Pub. Date: Dec. 6, 2007

(65) Prior Publication Data
US 2010/0109947 A1 May 6, 2010

(30) Foreign Application Priority Data

May 26, 2006 (FI) .................................... 20065354

(51) Int. Cl.
*G01S 19/42* (2010.01)
(52) U.S. Cl. ................................................. 342/357.25
(58) Field of Classification Search ............. 342/357.23, 342/357.25, 357.33
See application file for complete search history.

(56) References Cited

U.S. PATENT DOCUMENTS

| 5,565,858 | A | 10/1996 | Guthrie et al. | |
|---|---|---|---|---|
| 6,081,231 | A | 6/2000 | Evans et al. | |
| 6,618,671 | B2 * | 9/2003 | Dooley et al. | 701/213 |
| 6,865,478 | B2 * | 3/2005 | Sirola et al. | 701/207 |
| 7,032,763 | B1 | 4/2006 | Zakula et al. | |
| 7,400,294 | B2 * | 7/2008 | Whitehead et al. | 342/357.24 |
| 2002/0145557 | A1 | 10/2002 | Roy et al. | |
| 2002/0149515 | A1 * | 10/2002 | Alanen et al. | 342/357.1 |
| 2004/0257276 | A1 | 12/2004 | Huston et al. | |

FOREIGN PATENT DOCUMENTS

| EP | 05740009 | 12/1993 |
|---|---|---|
| GB | 2 382 482 A | 5/2003 |
| JP | 6-016888 A | 3/1994 |
| JP | 11-134025 | 5/1999 |
| JP | 11-240609 A | 9/1999 |
| WO | 98/34127 | 8/1998 |

OTHER PUBLICATIONS

Search Report dated Sep. 5, 2007 for International Application No. PCT/FI2007/050258 filed May 8, 2007.
English Language Translation of Notice of Reason for Refusal in Japanese Patent Application No. 2009-511535 dated Feb. 14, 2012, Japan Patent Office.
Supplementary European Search Report dated Nov. 29, 2011 that issued in European patent application No. EP 07 73 0745.

* cited by examiner

*Primary Examiner* — Gregory C Issing
(74) *Attorney, Agent, or Firm* — Drinker Biddle & Reath LLP

(57) ABSTRACT

A system and a method for determining the correct position for a GPS device from a predefined set of alternatives are provided. Based on the known positions of the visible GPS satellites and of the predefined alternative locations, the system determines theoretical distances between each satellite and each location and/or differences thereof. These distances are related to the distance measured between the GPS device antenna and each GPS satellite in order to choose the location from among the predefined location alternatives. Also disclosed are a system and a method for identification of predefined container slots on a freight yard.

18 Claims, 7 Drawing Sheets

SYSTEM AND METHOD FOR POSITIONING A GPS DEVICE

CROSS REFERENCE TO RELATED APPLICATIONS

This application is the National Stage of International Application No. PCT/FI2007/050258 filed May 8, 2007, and claims benefit of Finnish Application No. 20065354 filed May 26, 2006.

An objective in traditional GPS technology, and particularly with a GPS positioning device (5), is to determine the location of a GPS antenna (3) in a three-dimensional space. A presumption here is that the GPS antenna (3) may have an arbitrary location in the space. The novel invention introduces a method, which enables a better-than-before use of GPS positioning and a GPS positioning device (5) when the objective is to select the location of a GPS antenna (3) from a plurality of previously known alternative locations (8). A presumption here is that the GPS antenna (3) may not be located at an arbitrary position in space, but only in the vicinity of one of the predetermined locations (8).

A system of the invention can be used especially in container ports, container terminals, parking lots, storage yards, or in any application in which various types of general cargo, for example containers (12), pallets, passenger cars or mixed pieces of freight, are handled and stored in predetermined storage locations, such as for example in container parking slots (15), storage locations for pallets, or parking slots.

When the objective is to select the location of a GPS antenna (3) from a plurality of previously known alternatives (8), the traditionally applied method (FIG. 2A) proceeds as follows: in stage A, a GPS receiver (5) determines locations (2) for satellites (1) and measures range data (6) between the satellites (1) and a GPS antenna (3) (FIG. 1). The number of satellites received by the GPS receiver (5) is typically 5 . . . 10, generally the maximum number is 12 due to hardware limitations.

We shall now describe the range data (6) to the extent necessary for explaining the invention. As prior known to an expert in the art, the range data (6) comes in two types; a pseudorange calculated from a radio signal's transit time measurement and an accumulated doppler range calculated cumulatively from a carrier-wave phase measurement. In addition, the high-quality GPS receivers (5) measure both sets of range data at two different frequencies (L1=1575.42 MHz and L2=1227.60 MHz), the range data (6) actually comprising at each instant of time four pieces of data for each satellite (1).

The transit time measurement for a pseudorange proceeds on the following principle: A GPS satellite (1) transmits a radio message at regular intervals. Upon transmitting a message, the satellite (1) checks the instant of transmission time from its own clock and attaches this information to the message. Upon receiving a radio message, the GPS receiver (5) checks the instant of reception time from its own clock. Finally, the GPS receiver (5) calculates a difference between the instant of reception time and the instant of transmission time read from the message and is thereby capable of calculating a so-called apparent (pseudo) transit time. Ultimately, the transit time is converted into a (pseudo) range by using the speed of light as a presumed traveling speed of the radio signal.

The measurement for an accumulated doppler range proceeds on the following principle: A GPS receiver (5) measures a GPS signal carrier wave for its phase (L1 or L2). When the phase increases by one cycle (360 degrees), the receiver knows that the range between a satellite (1) and a GPS antenna (3) has increased by one carrier-wavelength cycle (L1 cycle=19.0 cm, L2 cycle=24.4 cm). The GPS receiver (5) monitors a cumulative phase change and thereby knows exactly the change of range.

In practice, a positional calculation is often effected by using a combination of range data obtained from a pseudorange and a doppler range. This is because the pseudorange is a comparatively noisy measurement (tens of centimeters), while the noise of a doppler range is very slight (millimeters). However, the most difficult problem with a doppler range is the fact that, although the changes of this range data from one instant of time to the next are extremely precise, the measurement includes an unknown constant, the initial value of a doppler range. For this reason, as obvious for those skilled in the art, it is a common practice to combine a pseudorange and a doppler range, such that the changes in the doppler range function to filter a noisy pseudorange measurement (carrier phase smoothing).

The range data (6) is subsequently used in reference to any piece of range information, which is derived as described above and which represents the range or distance between a given satellite (1) and a GPS antenna (3).

We shall subsequently describe also systematic error factors relevant to range data (6) to the extent necessary for explaining the invention. Both the pseudorange measurement and the doppler range measurement include an error of equal magnitude resulting from the running error of a GPS receiver's (5) clock. In addition, the error is equal for each satellite, since the question is about an error caused by the receiver (5). Furthermore, the atmosphere inflicts error in range measurements as the radio signal does not travel in the atmosphere at the exact speed of light. As known, an error occurring in the troposphere has the same affect to the measurement of a pseudorange and a doppler range. On the other hand, an error occurring in the ionosphere is equal, yet of opposite direction, in the measurements of a pseudorange and a doppler range. The atmosphere-inflicted errors are different for different satellites, the distance traveled by a radio signal in the atmosphere being different.

Moreover, there is error included in a determination (2) of the positional information for satellites (1). The satellite (1) is in reality located at a position (2'), which is other than the measured position (2). And still lastly, there is running error also in the satellite's clock. In terms of measurements, however, this satellite clock error appears exactly the same as the satellite's positional error, so these two errors are usually processed jointly.

In Stage B (FIG. 2A), positional data (2) for satellites (1), as well as range measurements (6) between the satellites (1) and a GPS antenna (3), are used for calculating presumed location data (4) for the GPS antenna (3), which, because of measuring errors as described above, does not of course necessarily coincide exactly with a true location (4') of the GPS antenna (3). The least number of satellites (1), necessary for calculating the location (4) of the GPS antenna (3), is basically 4.

In order to avoid an error resulting from the erroneous running of the GPS receiver's (5) clock, the calculation for the location (4) is generally performed by means of so-called difference ranges. An individual range measurement (6) is denoted as $p_i$, which represents the measured distance of a GPS antenna (3) from a satellite i. As noted above, $p_i$ is often a combination of the pseudorange and the doppler range. The satellite i=r is selected to serve as a so-called reference satellite, followed by calculating difference ranges $dp_i$ for all other satellites as follows:

$$dp_i = (p_i - p_r), \text{ for all } i \neq r$$

In difference ranges calculated this way, a clock error of the receiver (5) is no longer present. As prior known, when the location (4) of a GPS antenna (3) is now determined by means of distances $dp_i$, the effect of a clock error in the receiver (5) has been eliminated.

In order to further enhance positioning accuracy in terms of the location data (4) of the GPS antenna (3), there is often used also a second GPS device (5b) and a second GPS antenna (3b) connected thereto, the latter being set at a fixed, previously known location (4b). In this case, a determination of the location data (4) of the GPS antenna (3) will be further facilitated by using also range measurements (6b) between the satellites (1) and the stationary GPS antenna (3b), as well as the location data (4b) of the stationary GPS antenna (3b). The sets of information (6b) and (4b) are usually transmitted by radio equipment (7) from a GPS device (5b) to a GPS device (5) (FIG. 1).

We shall next describe a joint use of the range information sets (6) and (6b) to the extent necessary for explaining the invention. We denote the difference ranges calculated by a GPS device (5) with a symbol $dp_i^R$ (Rover) and the difference ranges calculated in an exactly equivalent manner by a GPS device (5b) with a symbol $dp_i^B$ (Base station), wherein i refers to the number of a given satellite. Since the information (6b) is transmitted by radio equipment (7) to a GPS device (5), both difference ranges are available for processing by the GPS device (5). As perfectly familiar to an expert from the prior art, in order to decrease the effect of errors resulting from atmospheric disturbances, mispositions of satellites, as well as from clock errors of satellites, on calculating the location data (4) of a GPS antenna (3), the GPS device (5) typically calculates following double difference ranges $ddp_i$ (double difference observations):

$$ddp_i = (dp_i^R - dp_i^B), \text{ for all } i \neq r$$

Naturally, these double difference ranges can only be calculated for those satellites which are simultaneously visible to each of the GPS devices (5) and (5b).

As the GPS antennas (3) and (3b) are often located quite close to each other (for example 1 . . . 10 kilometers), the effect of a large portion of atmosphere-induced errors on the receivers (5) and (5b) is identical and thereby eliminated from the difference. Thereafter, the location (4) of a GPS antenna (3) is calculated by using the differences $ddp_i$, and the effect of errors on calculation is thereby decreased. It should be noted, however, that the discussed technique does not eliminate errors completely, but the calculated location (4) of the GPS antenna (3) can nevertheless differ by several meters from the true location (4') (FIG. 3).

According to traditional technique, the calculation of location data (4) takes place inside a GPS device (5), which outputs the location data (4) of a GPS antenna (3) to an end user e.g. in the form of a standardized 'GPGGA' message. Most often, the location data (4) of a GPS antenna (3) is expressed in angular geographical coordinates (Latitude, Longitude), as well as in an elevation from the ground (height). However, these coordinates can be converted by generally known formulae for a rectangular set of xyz-coordinates.

In Stage C (FIG. 2A), according to traditional technique, when location data (4) for a GPS antenna (3) has finally been determined, the location data (4) is compared with previously known, alternative locations (8) of the GPS antenna (3). The comparison is generally effected by calculating distances $D_j$ (9) between the location data (4) and each optional alternative location (8) of the GPS antenna (3) (FIG. 3). These distances can be calculated by a formula:

$$dj = sqrt((x^A - x_j^R)^2 + (y^A - y_j^R)^2 + (z^A - z_j^R)^2), \text{ for all } j \qquad (3)$$

wherein $x^A$, $y^A$ and $z^A$ are position coordinates for the calculated location (4) of a GPS antenna (3), and $x_j^R$, $y_j^R$ and $z_j^R$ are coordinates for a particular alternative location j.

This is followed by choosing from amongst the alternatives (8) a location which is closest to the calculated location (4) of a GPS antenna (3), i.e. a location corresponding to the smallest value $D_j$.

A major drawback in the method is that, upon converting, in stage B, the positional data (2) of satellites (1), as well as range measurements (6), as well as possibly also range measurements (6b) and a known location (4b), into location data (4) of a GPS antenna (3), a great deal of information will be lost. Information is lost because a GPS receiver (5) is generally able to see so many satellites (1) that the number would enable the GPS receiver (5) to calculate a large number of alternative locations for a GPS antenna (3) but, for practical reasons, it only presents an end user with a type of weighted average location (4) for the position of a GPS antenna (3).

We shall next describe here the calculation of an average location (4) to the extent necessary for explaining the invention. It is obvious for the expert that knowing three double difference observations $ddp_i$, as well as locations of the satellites, would enable working out the location of a GPS antenna (3) uniquely. This is effected normally by solving a linearized set of equations, which includes three equations and three unknowns. However, since the number of satellites (1) that are observed is most often more than four, the number of double difference observations $ddp_i$ will be more than three and the result will be a linearized set of equations, which includes three unknowns and more than three equations. As prior known, an set of equations such as this is typically solved by means of a so-called least squares solution, which chooses such a value for the location (4) of a GPS antenna (3) that the weighted sum of squared residuals shall be minimized.

As noted earlier, this averaging results in losing a great deal of original information. This may often lead to a situation that, when comparing the location data (4) of a GPS antenna (3) and the sets of alternative location data (8), there is no way of knowing, with a high degree of certainty, whether the correct location will be selected from amongst the previously determined alternatives (8) but, instead, because of the noise involved in measurements, it is also possible to choose a wrong alternative by mistake.

DESCRIPTION OF THE NOVEL INVENTION

In order to eliminate this drawback, a method according to the novel invention, for selecting a correct location alternative from a plurality of previously determined alternatives (8), comprises replacing the stages, stage B and stage C, by performing new, different stages, stage D and stage E (FIG. 2). This results in a total omission of the adverse intermediate stage B.

A method of the invention comprises performing a stage A (FIG. 2B) the same way as in traditional technique, i.e. a GPS receiver (5) determines locations (2) for satellites (1) and measures range data (6) between the satellites (1) and a GPS antenna (3).

This is followed by proceeding to stage D, which comprises determining a theoretical range $S_{ij}^R$ (10) between the location data of each satellite (1) and each alternative location (8) of the GPS antenna (3) (FIG. 4). This theoretical range can be calculated for example by means of a formula:

$$S^r{}_{ij}=sqrt((x^S{}_i-x^R{}_j)^2+(y^S{}_i-y^R{}_j)^2+(z^S{}_i-z^R{}_j)^2), \text{ for all } i, \text{ for all } j \quad (4)$$

wherein $x^S{}_i$, $y^S{}_i$ and $z^S{}_i$ are positional coordinates for a satellite i, and $x^R{}_j$, $y^R{}_j$ and $z^R{}_j$ are coordinates for a particular alternative location j (8) of the GPS antenna (3).

It is notable that a traditional GPS receiver (5) does not execute stage D, nor would it even be capable of executing it as a traditional GPS receiver (5) is not informed of alternative locations (8) for a GPS antenna (3). A traditional GPS receiver (5) determines a location (4) for a GPS antenna (3) totally unaware of the plurality of possible alternative locations (8).

Finally, according to one application of the invention, stage E (FIG. 2B) comprises comparing theoretical ranges (10) with measured ranges (6) for consistency. As described above, it is advisable to calculate difference ranges $dp_i$ from the range data (6). Then, for enabling the comparison, there would also be calculated, by using the same reference satellite i=r as in the process of calculating the values $dp_i$, respective theoretical difference ranges $dS^R{}_{ij}$:

$$dS^R{}_{ij}=S^r{}_{ij}-S^r{}_{rj}, \text{ for all } i\neq r, \text{ for all } j \quad (5)$$

This would be followed by determining for each alternative location j (8) an error sum $\sigma_j$(11), which expresses how well the theoretical ranges (10) of various satellites comply with the measured ranges (6) together. To measure the compliance, it is possible to use for example the following error sum $\sigma_j$ (11) (FIG. 4):

$$\sigma_j=\Sigma_{\text{in all } i\neq r}[w_i(dp_i^R-dS^R{}_{ij})^2], \text{ of all } j \quad (6)$$

wherein $dp_i^R$ are, as determined earlier, difference ranges calculated by a GPS device (5) and $w_i$ is a weighting coefficient, whereby the reliability of measurement of a satellite i can be expressed as desired. Finally, one of the alternative locations (8) is chosen and that will be the one that has acquired the numerically smallest error sum (11).

In addition, the method can be improved in terms of its accuracy by using a further second GPS device (5b) and a second GPS antenna (3b), connected thereto and placed at a fixed, prior known location (4b). In this case, the invention also comprises making use of range measurements (6b) between satellites (1) as well as the stationary GPS antenna (3b), as well as a set of location data (4b) for the stationary GPS antenna (3b), by calculating also theoretical ranges (10b) between the satellites (1) and the stationary GPS antenna (3b) (FIG. 4).

This theoretical range or distance can be calculated for each satellite (1) for example by means of a formula:

$$S^B{}_i=sqrt((x^S{}_i-x^B)^2+(y^S{}_i-y^B)^2+(z^S{}_i-z^B)^2), \text{ for all } I \quad (7)$$

wherein $x^S{}_i$, $y^S{}_i$ and $z^S{}_i$ are positional coordinates for a satellite i, and $x^B$, $y^B$ and $z^B$ refer to a location (4b) a the GPS device's (5b) antenna (3b).

This is followed by comparing theoretical ranges (10) and (10b) with measured ranges (6) and (6b) for consistency. The sets of data (6b) and (4b) can again be transmitted by means of radio equipment (7) from the GPS device (5b) to a new device of the invention, which corresponds to the GPS device (5) and which should be provided with a calculation as described in the invention and with a special map database, which contains geographic information for all alternative locations (8). For each alternative location j of a GPS antenna (3) could be determined again a respective error sum $\sigma_j$ (11) (FIG. 4), by calculating the following quantities:

$$dS^B{}_i=S^B i-S^B{}_r, \text{ for all } i\neq r \quad (8)$$

$$ddS_{ij}=dS^R{}_{ij}-dS^B{}_i, \text{ for all } i\neq r, \text{ for all } j \quad (9)$$

$$\sigma_j=\Sigma_{\text{in all } i\neq r}[w_i(ddp_i-ddS_{ij})^2], \text{ of all } j \quad (10)$$

wherein $ddp_i$ are, as determined earlier, double difference ranges calculated from range data (6) and (6b), and $w_i$ is a weighting coefficient, which can be used as desired for expressing the reliability of measurement of a satellite i. Finally, one of the alternative locations j (8) is chosen and that will be the one that has acquired the numerically smallest error sum $\sigma_j$ (11).

This new method enables avoiding stage B of the traditional method, a calculation of location data (4) for a GPS antenna, which is an unnecessary and adverse intermediate stage resulting in losing a great deal of available information. It has been observed in practical tests that the prior art method may result in up to a hundred times more mistakes as compared to the novel method, so the novel method provides an undeniable advantage.

We Shall Now Concentrate Specifically on the Operation of a Container Port or an Inland Container Terminal.

In a container port or container terminal, containers (12) are moved by a variety of container handling machines (13) such as, for example, a straddle carrier, a forklift truck or a mobile gantry crane (RTG, RMG), for example from a quay crane, a trailer truck or a railway car to storage slots in a container yard (14), which shall be subsequently referred to as container slots (15).

Container slots are generally marked on the ground by painting or by way of a pavement, whereby the location thereof is stationary in the seaport. The container slots (15) within the container yard (14) are typically set up rectangularly as rows and bays (FIG. 5), to make it as easy as possible for the container handling machines (13) to operate between containers.

The container slots (15) can accommodate a number of containers (12) laid on top of each other for stacks as high as two (especially a straddle carrier) to typically six (especially a mobile gantry crane) containers. Unloaded, i.e. empty and thereby light containers (12) can be piled up for a stack with a height of up to eight containers (especially a forklift truck).

Respectively, the container handling machines (13) retrieve containers (12) from the container yard's (14) container slots (15) and carry those to a quay crane, a trailer truck or a railway car, when a particular container (12) is needed again. Every container (12) is provided with a specific identification code (19) for distinguishing the container in question from all other containers.

As perfectly obvious for an expert even from the prior art, a location (16) on the ground for the center of each container slots (15) can be expressed as xyz-coordinates for example in meters (or merely as xy-coordinates, if elevation data is not necessary) in an arbitrarily selected set of coordinates within the area of a seaport. For the sake of clarity, we shall subsequently presume that the z-coordinate points in upward direction, orthogonally to the local ground level. The elevation coordinate (z) for a container slot's (15) location (16) is required whenever it is necessary to know the variation resulting from ground level undulations within a seaport area. We shall subsequently use the following denotations:

($16_{xy}$)=horizontal location data for a container slot without a z-coordinate, as well as (16)=complete three-dimensional location data for a container slot.

The geographic location data (16) corresponding to all of the alternative container slots (15) can be stored in a specific map database (17) (FIG. 5). When the container handling machine (13) brings a container (12) to a particular container slot (15), the location of this container shall be stored in the memory of the information system (18) of the seaport or terminal (TOS=Terminal Operating System), so that the particular container can be quickly located and picked up again later. As known from the prior art, this can be implemented for example by storing in the seaport terminal information system (18), along with a container identifier (19), the location data (16) corresponding to the particular container slot (15) in which the container (12) is left (FIG. 6). In practice, what is stored in the information system (18) is often not numerical geographic location data (16) but instead a specific name for the container slot (15), which nevertheless, for example by means of a table, can be determined directly from the container slot location data (16).

An object of the invention is a method, which is better than the prior known methods in terms of determining a particular container slot (15a) for parking or picking up a container (12). The capability of reliably locating a container slot is important for the terminal information system (18) not to be supplied with false information, which in the worst case could lead to the misplacement of a container (12) and a waste of time in searching it. Especially in the process of loading a ship, the seaport operation must proceed in an efficient and flawless manner.

It is prior known that, in order to determine a particular container slot (15a) for placing or picking up a container (12), the container handling machine (13) can be fitted with a special satellite positioning or GPS antenna (3), as well as with a GPS receiver device (5) for measuring a location of the container handling machine (13) (FIG. 7). It is a general objective that a GPS antenna (3) be positioned exactly on top of the center of a spreader, whereby the horizontal xy-coordinates of the GPS antenna's (3) location coincide with the horizontal xy-coordinates of the carried container's (12) center. We shall subsequently use the following denotations:

($4_{xy}$)=horizontal location data for a GPS antenna without a z-coordinate, as well as (4)=complete three-dimensional location data for a GPS antenna.

As known from the prior art, at the moment when so-called container twist-locks included in the spreader of a container handling machine (13) are released, it can be presumed that a container (12) is being left in one of the predetermined container slots (15). By reading at the same moment a GPS antenna's (3) location data (4), calculated by a GPS receiver (5), it can be presumed that the horizontal coordinates ($4_{xy}$) of the location data (4) coincide quite precisely with the horizontal position of a parked container (12) in the container yard.

Respectively, at the moment when so-called container twist-locks included in the spreader of a container handling machine (13) are closed, it can be presumed that a container (12) is being picked up from a predetermined container diamond (15). By reading at the same moment a GPS antenna's (3) location data (4), calculated by a GPS receiver (5), it can be presumed that the horizontal coordinates ($4_{xy}$) of the location data (4) coincide quite precisely with the horizontal position of a picked-up container (12) in the container yard.

This is followed, according to a traditional method, by comparing the measured horizontal location ($4_{xy}$) of the GPS antenna with horizontal locations ($16_{xy}$) of all possible container slots (15) of the map database (17), and this comparison is used as a basis for selecting the container slot (15) whose coordinates ($16_{xy}$) are closest to the location ($4_{xy}$) measured by the GPS device (5).

In the event that, for some reason, a GPS antenna (3) cannot be positioned directly above the center of a spreader, it is nonetheless possible, as prior known, to calculate indirectly an estimated location for the center of a container (12) at the moment of pick-up or lay-down, as long as the orientation (especially the heading) of a container handling machine (13) is known ata the moment of pick-up.

It is a recognized and serious problem that the signals measured by a GPS receiver (5) contain disturbance elements and noise, as a consequence of which the location data (4) of a GPS antenna (3) calculated by a GPS receiver (5) does not necessarily comply with a true location (4') of the GPS antenna (3). For this reason it is possible, and unfortunately common, that the chosen container slot (15) is not, after all, a correct container slot (15a), but an incorrect, most often neighboring container slot (15b). As a result of this, the information system (18) will be informed of a wrong container slot (15b). The presently proposed invention improves substantially the reliability in identifying a correct container slot (15a) and thereby eliminates a serious problem existing in the prior art.

We Shall Now Describe a Difference Between a Traditional Method and the Present Invention, Especially in a Container Port Application:

Traditional GPS positioning for the identification of a correct container slot (15) proceeds according to the following principle: in stage A, as explained before, a GPS receiver (5) determines locations (2) of satellites (1), as well as measures range data (6) between the satellites (1) and a GPS antenna (3).

In stage B, the location data (2) of satellites (1), as well as the range measurements (6) between the satellites (1) and a GPS antenna (3), are used for calculating location data (4) for the GPS antenna (3). In order to improve the determination accuracy of the GPS antenna's (3) location data (4), as known in the prior art, it is advisable to employ also a second GPS device (5b) and a second GPS antenna (3b), the latter being placed in a stationary, prior known location (4b) as described earlier.

Once the location data (4) for a GPS antenna (3) is determined, it will be compared in stage C with location data (16) for container slots (15) in a container yard (14). This is usually done by only comparing sets of horizontal location data ($4_{xy}$) and ($16_{xy}$) with each other. This is followed by selecting a particular one of the container slots (15) whose location data ($16_{xy}$) is closest to said location ($4_{xy}$) of the GPS antenna (3). Hence, the decision is made on the basis of the distance between the location data ($16_{xy}$) of a container slot (15) and the location data ($4_{xy}$) of a GPS antenna (3).

A major drawback in the method is that, when in stage B the location data (2) of satellites (1), as well as the range measurements (6) as well as possibly also range measurements (6b) and a known location (4b), are converted into the location data (4) of a GPS antenna (3), a great deal of information will be lost. A result may often be such that, in the process of comparing location data (4) of a GPS antenna (3) and location data (16) of container slots (15), there is no way of knowing with a high degree of certainty whether a correct container slot (15a) is selected or whether a wrong container slot (15b) is selected by mistake because of the noise involved in measurements.

In order to eliminate this drawback, a novel invention is proposed, wherein, in order to identify a correct container slot (15), stage A will be followed by executing stage D, which comprises determining a theoretical range or distance (10) between the location data (2) of every satellite (1) and a location (16*) of the GPS antenna (3) corresponding to the location data (16) of every alternative container slot (15) (FIG. 7). An objective here is to provide an installation, wherein a GPS antenna (3) mounted on a container handling machine (13) stays at a standard height (H) from the ground, so that the location data (16*) of a GPS antenna (3) matching the location data (16) (x, y, z) of a container diamond (15) will be (x, y, z+H).

This is followed, in stage E, by comparing the theoretical ranges (10) to the measured ranges (6) for consistency, as described earlier. Finally, a chosen container slot (15) will be the one that has acquired the smallest error sum (11).

In order to improve the method in terms of its accuracy, it is also advisable to employ a further second GPS device (5b) as well as a stationary GPS antenna (3b) as described above.

This method enables avoiding stage B of the traditional method, a calculation of location data (4) for a GPS antenna, which is an unnecessary and adverse intermediate stage resulting in losing a great deal of available information.

In practical tests for measuring the systems for performance, it is discovered that, when using the prior known method of poorer standard, in which a container diamond is selected on the basis of the calculated location (4) of a GPS antenna (3), instead of using the present invention and the above-described error sum (11), the number of errors made by the prior art method exceeds that of the present invention by up to 100 times.

The method is novel and innovative for the reason that, without exception, the traditional commercially available GPS receivers (5) calculate location data (4) for a GPS antenna (3) and output this information to an end user of the device for utilization in various positioning applications. All prior known positioning systems for containers have used the thus obtained GPS antenna's (3) location data (4) for selecting a container.

The method is innovative for the reason that, although positioning systems for containers have been implemented for more than 15 years, the system has never before been implemented according to a method proposed by the invention despite the fact the method of the invention provides as much as a hundred-fold improvement in the reliability of identifying a correct container slot (15a). The method is innovative also for the reason that, if desired, several commercial GPS receivers (5) also output location data (2) of satellites (1) as well as range measurements (6) to an end-user, so there has not been any technical obstacle in the way of implementing a system of the invention, but the only obstacle has been the fact that no one has come up with this invention earlier.

LIST OF FIGURES

FIG. 1 shows a typical GPS measuring system, wherein a traditional GPS device (5) pursues to determine a GPS antenna's (3) location (4) by measuring ranges (6) from satellites (1) to the GPS antenna (3). For improved precision, there is often used also a second GPS receiver (5b), having its GPS antenna (3b) placed in a stationary, known location (4b). The GPS receiver (5b) is also used for measuring ranges (6b) from satellites (1) to the GPS antenna (3b). The GPS receiver (5b) transmits the sets of information (6b) and (4b) to the receiver (5) typically by using radio equipment (7). The GPS devices are also capable of determining the locations (2) of the satellites (1).

FIG. 2 shows the difference between a traditional method (FIG. 2A) and a method of the invention (FIG. 2B). Both methods determine in stage A locations (2) for satellites (1), as well as measured ranges (6) between the satellites (1) and a GPS antenna (3). In order to improve accuracy, both methods can also determine measured ranges (6b) between the satellites (1) and a stationary GPS antenna (3b), the utilization of which information requires that a stationary location (4b) of the GPS antenna (3b) be known as well.

In FIG. 2A, stage B, the traditional method calculates the GPS antenna's (3) location (4). In this stage B, a great deal of measuring information is lost, which is why the prior art method is often short in performance. Thereafter, in stage C, the traditional method selects a location of the GPS antenna (3) from a plurality of previously known alternatives (8).

In FIG. 2B, stage D, the new method of the invention calculates theoretical ranges (10) corresponding with each alternative location (8) of the GPS antenna (3) and, for improved accuracy, possibly also those (10b) to the satellites (1).

Thereafter, in stage E, the new method of the invention selects, by comparing the theoretical ranges (10) and possibly also (10b) with the measured ranges (6) and possibly also with (6b), a location of the GPS antenna (3) from a plurality of previously known alternatives (8).

FIG. 3 shows the operating principle of a traditional method for selecting the location of a GPS antenna (3) from a plurality of previously known alternatives (8) (stage C). The traditional method comprises calculating a distance $D_j$ (9) from a calculated location $(x^A, y^A, z^A)$ (4) of the GPS antenna (3) to with respect to each alternative location $(x^R_j, y^R_j, z^R_j)$ (8). Finally selected is a location (8), the distance $D_j$ (9) corresponding to which is the shortest. The calculated location (4) of the GPS antenna (3) does not necessarily coincide with a true location (4') of the GPS antenna (3), which is why the traditional method may often select an incorrect location (8).

FIG. 4 shows the operating principle of a new method of the invention for selecting the location of a GPS antenna (3) from a plurality of previously known alternatives (8). In stage D, the new method calculates theoretical ranges $S^R_{ij}$ (10) from locations $(x^S_i, y^S_i, z^S_i)$ (2) of the satellites (1) to each alternative location $(x^R_j, y^R_j, z^R_j)$ (8) of the GPS antenna (3). For improved accuracy, it is also possible to calculate ranges $S^B_i$ (10b) from the satellites' (1) locations (2) to a location $(x^B, y^B, z^B)$ (4b) of the stationarily mounted GPS antenna (3b). Stage E comprises calculating an error sum $\sigma_j$ (11) for each alternative location (8) of the GPS antenna (3), which expresses how well the theoretical ranges (11) and possibly (11b) match the measured ranges (6) and possibly (6b). Finally selected is a location (8), the error sum $\sigma_j$ (11) corresponding to which is the smallest.

Figure 1:
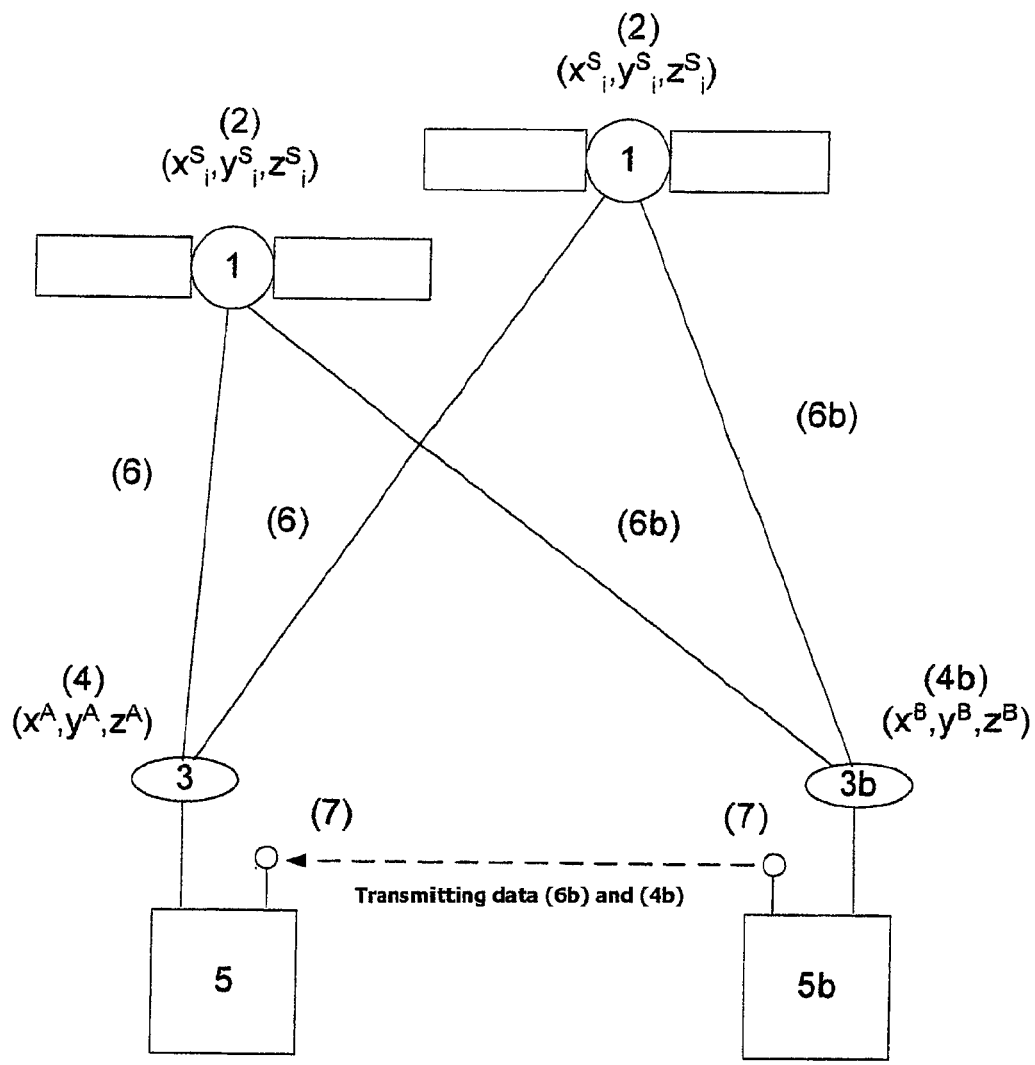
Figure 2A:
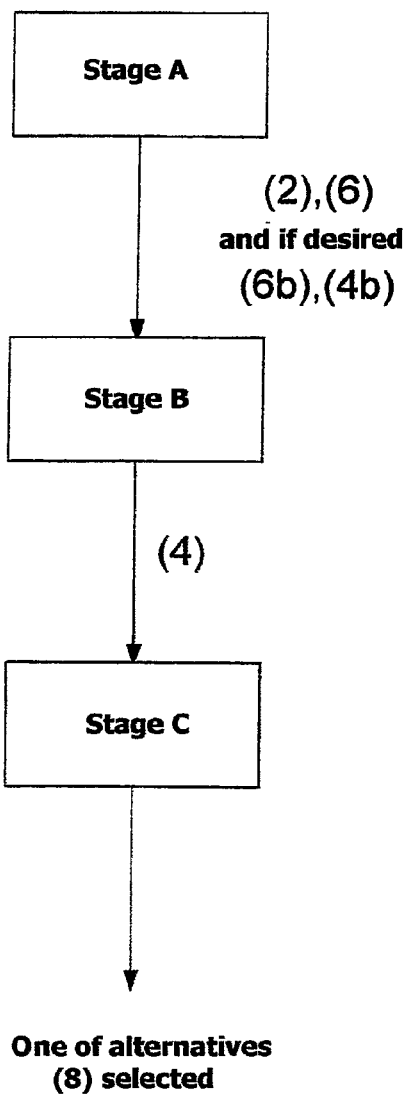
Figure 2B:
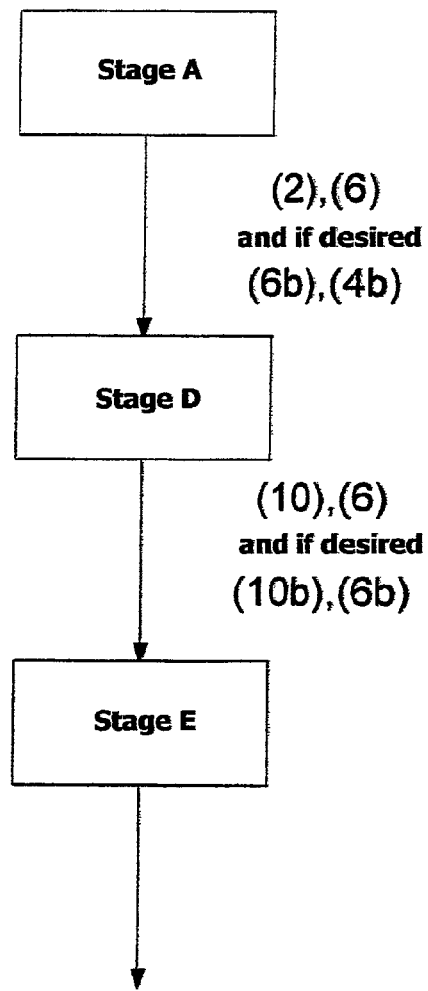
Figure 3:
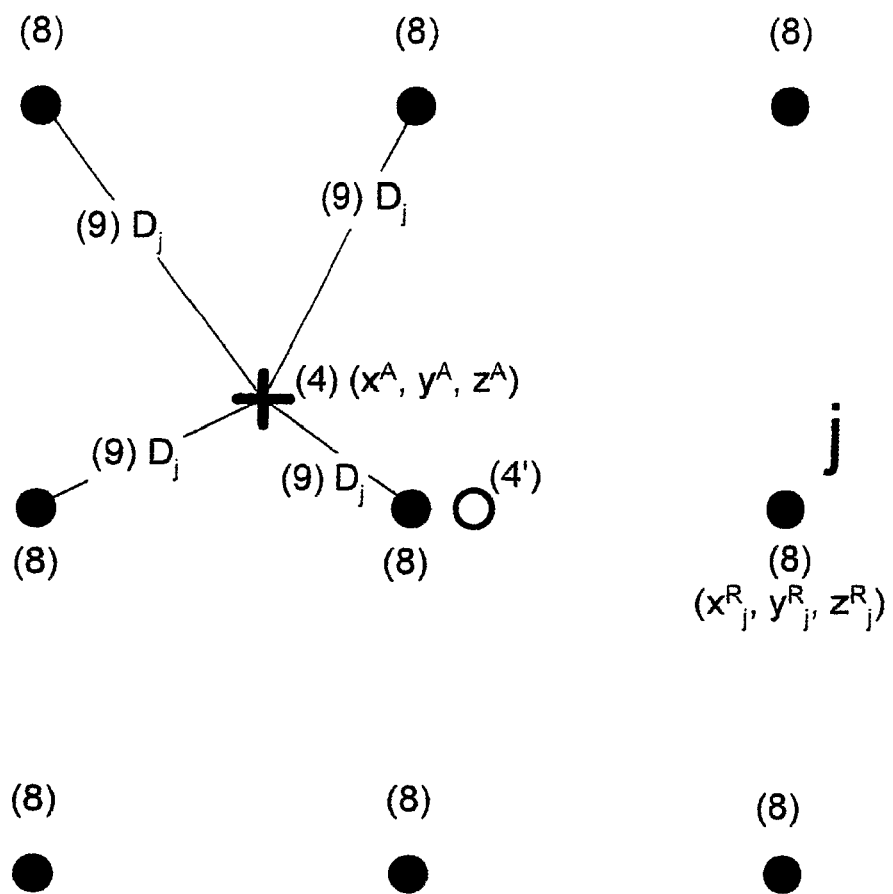
Figure 4:
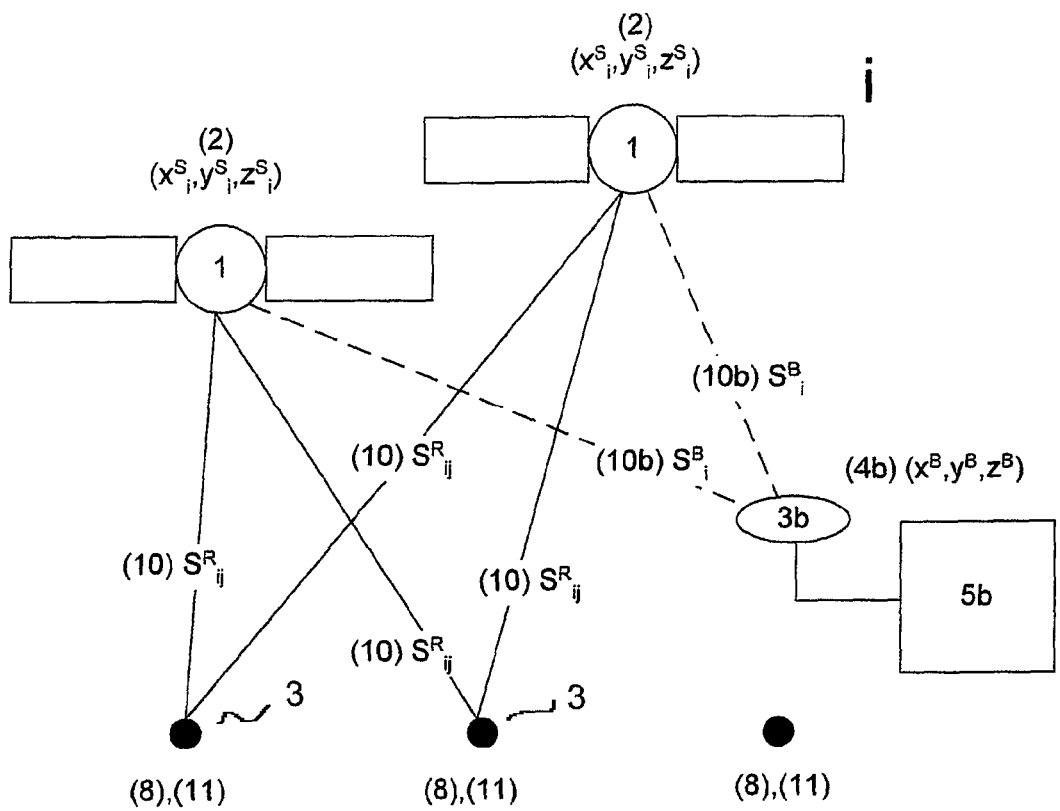
Figure 5:
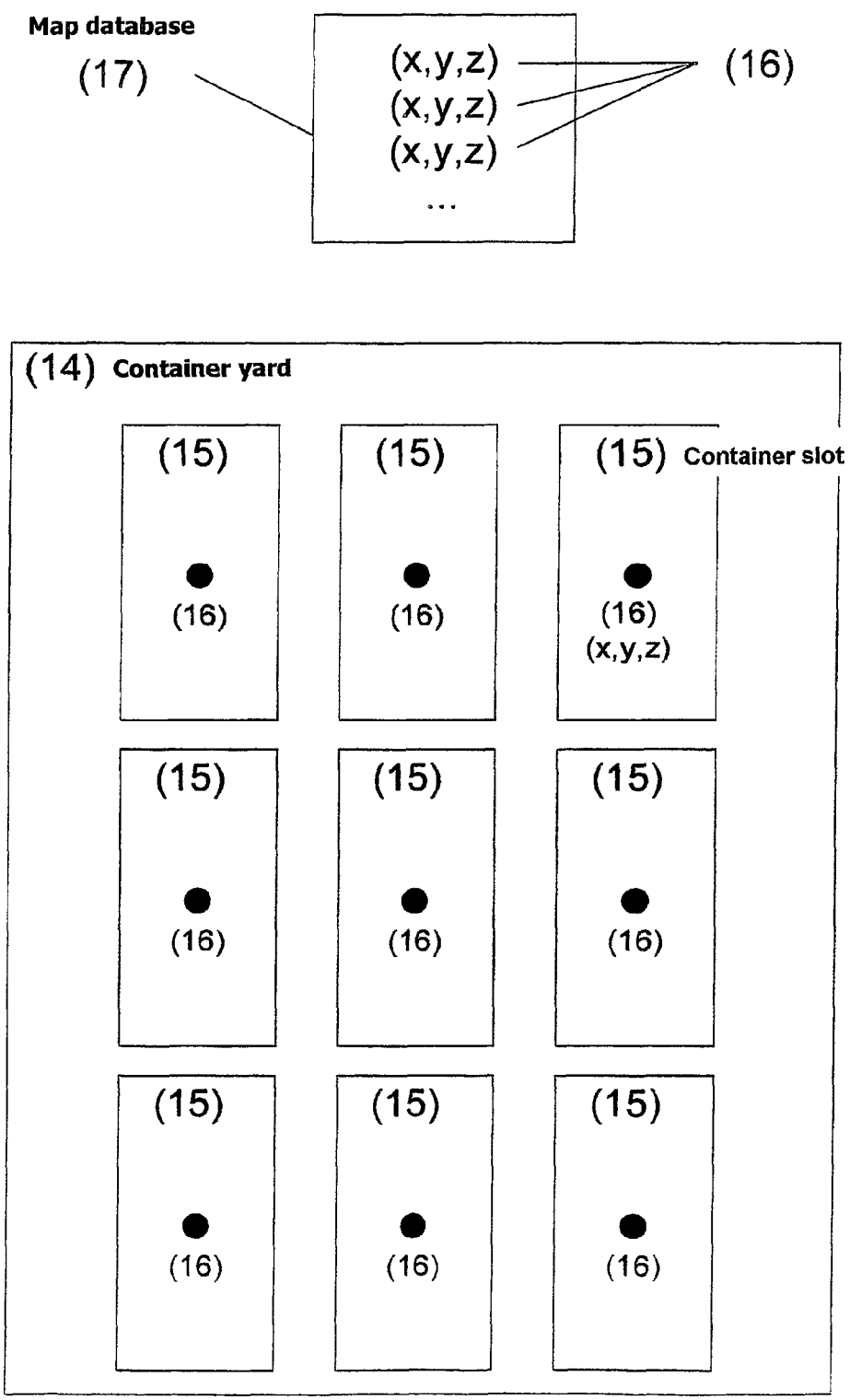
FIG. 5 shows a container yard (14) in a typical arrangement, having container slots (15) organized in rows and bays. The center of each container slot (15) has its coordinates (16) on the earth's surface stored in a map database (17).
Figure 6:
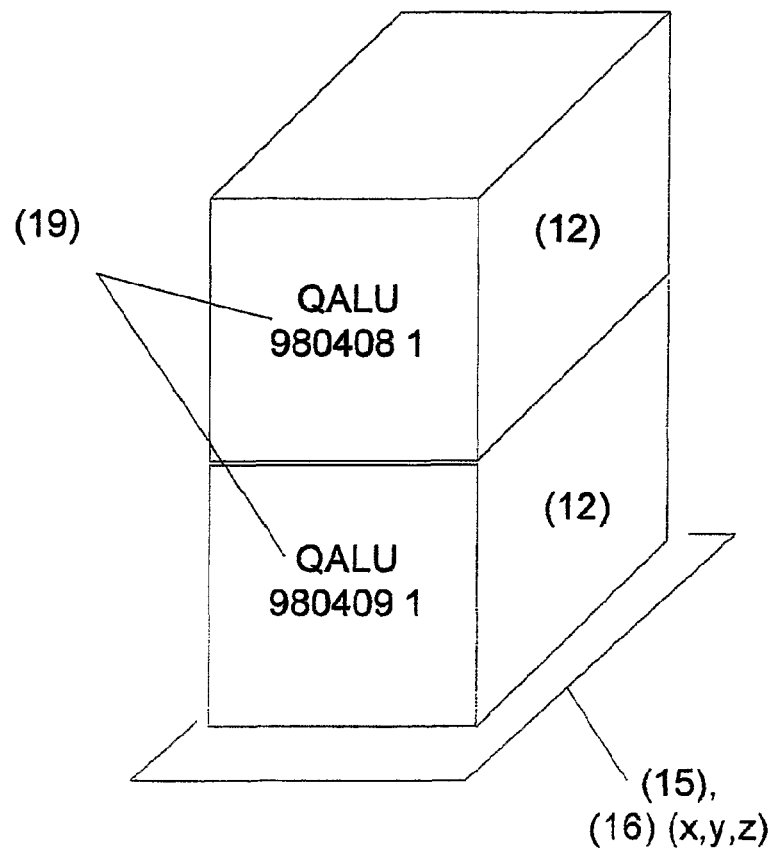
FIG. 6 shows a terminal operating system (TOS) (18) in a simplified configuration. The system has stored therein identifiers (19) for containers (12) presently in the terminal, as well as real-time location data (16) for the containers or a specific name which can be derived from the data (16) or (15).
Figure 7:
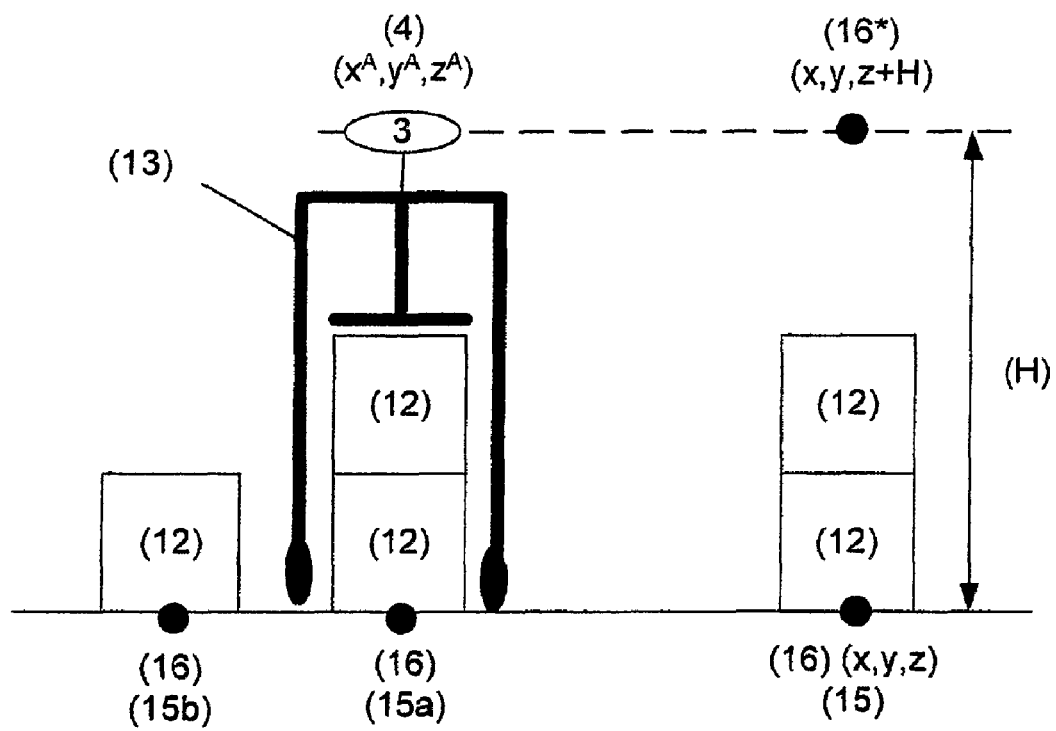

FIG. 7 shows the operation of GPS positioning in the process of picking up or placing down a container (12). When the container (12) is picked up or placed down by a container handling machine (13), a GPS antenna's (3) location (4) is measured as per traditional technique. It is presumed that said location (4) has its xy-coordinates $(4_{xy})$ matching xy-coordinates $(16_{xy})$ of the center of a corresponding container slot (15a). However, if a major error occurs in GPS calculation, in the determination of the antenna's (3) location (4), there is a hazard of selecting a wrong container slot (15b) by mistake.

A system according to the new invention presumes also that, in the process of picking up a container or placing down a container, the GPS antenna (3) is positioned quite accurately above the center of a container slot (15a). In this case, the new system calculates a theoretical location (16*) of the GPS antenna (3) consistent with a center (16) of the container slot (15) by presuming that the GPS antenna (3) lies at a height H from the ground level.

The invention claimed is:

1. A system for positioning a GPS device, comprising:
    a GPS antenna (A);
    a GPS device to which the GPS antenna (A) is connected, the GPS device comprising:
        means for receiving signals from a plurality of GPS satellites;
        means for saving a plurality of previously known alternative locations;
        means for selecting a correct location of the GPS antenna (A) from the plurality of previously known alternative locations;
        for performing said selecting, means for determining theoretical ranges between the GPS satellites and the alternative locations on the basis of positional data of the GPS satellites as well as positional data of the alternative locations; and
        means for comparing the calculated theoretical ranges with ranges measured by the GPS device between the GPS satellites and the GPS antenna (A).

2. A system as set forth in claim 1, which, for improved reliability, makes use of a second, stationarily mounted GPS antenna B and a second GPS device, wherein, in order to select the correct location of the antenna (A) connected to the GPS device, the GPS device determines theoretical ranges between GPS satellites and the second GPS antenna (B) on the basis of positional data of the GPS satellites as well as positional data of the second GPS antenna (B).

3. A system as set forth in claim 2, wherein, in order to select the correct location of the antenna (A) connected to the GPS device, the GPS device compares the calculated theoretical ranges with ranges between GPS satellites and the GPS antenna (A) connected to the GPS device and between GPS satellites and the second GPS antenna (B).

4. A system as set forth in claim 2, wherein the GPS device determines theoretical ranges between GPS satellites and the second GPS antenna (B) and differences between these ranges, on the basis of positional data of the GPS satellites as well as positional data of the second GPS antenna (B).

5. A system as set forth in claim 3, wherein the GPS device compares the calculated theoretical ranges and differences between these ranges with ranges and differences between GPS satellites and the GPS antenna (A) connected to the GPS device and between GPS satellites and the second GPS antenna (B).

6. A service application for a system as set forth in claim 1, wherein the system is used for a correct identification of storage slots for containers or other general cargo.

7. A service application as set forth in claim 6, wherein the system is operated by mounting the GPS antenna (A), connected to the GPS device, on a vehicle carrying containers or other general cargo.

8. A system as set forth in claim 1, wherein performing said selecting comprises
    means for determining theoretical ranges between the GPS satellites and the alternative locations and differences between these ranges, on the basis of positional data of the GPS satellites as well as positional data of the alternative locations; and
    means for comparing the calculated theoretical ranges and differences between these ranges with ranges and differences measured by the GPS device between the GPS satellites and the GPS antenna (A).

9. A method by which a correct location of a GPS antenna (A) connected to a GPS device is selected from a plurality of previously known alternative locations, the plurality of previously known alternative locations being saved in means for saving provided in the GPS device, wherein in order to select the correct location of the antenna (A) connected to the GPS device,
    theoretical ranges between a plurality of GPS satellites and the saved alternative locations are determined on the basis of positional data of the GPS satellites as well as positional data of the saved alternative locations, and
    the calculated theoretical ranges are compared with measured by the GPS device between GPS satellites and the GPS antenna (A).

10. A method as set forth in claim 9, comprising, for improved reliability, the use of also a second, fixed-location mounted GPS antenna (B) and a second GPS device, wherein, in order to select the correct location of the antenna (A) connected to the GPS device, the theoretical ranges between GPS satellites and the second GPS antenna (B) are determined on the basis of positional data of the GPS satellites as well as positional data of the second GPS antenna (B).

11. A method as set forth in claim 10, wherein, in order to select the correct location of the antenna (A) connected to the GPS device, the calculated theoretical ranges are compared with ranges between GPS satellites and the GPS antenna (A) connected to the GPS device and between GPS satellites and the second GPS antenna (B).

12. A method as set forth in claim 11, wherein the method is used for a correct identification of storage slots for containers or other general cargo.

13. A method as set forth in claim 10, wherein the theoretical ranges between GPS satellites and the second GPS antenna (B) and differences between these ranges are determined on the basis of positional data of the GPS satellites as well as positional data of the second GPS antenna (B).

14. A method as set forth in claim 11, wherein the calculated theoretical ranges and differences between these ranges are compared with ranges and differences between GPS satellites and the GPS antenna (A) connected to the GPS device and between GPS satellites and the second GPS antenna (B).

15. A method as set forth in claim 9, wherein the method is used for a correct identification of storage slots for containers or other general cargo.

16. A method as set forth in claim 15, wherein the method is operated by mounting the GPS antenna (A), connected to the GPS device, on a vehicle carrying containers or other general cargo.

17. A method as set forth in claim 10, wherein the method is used for a correct identification of storage slots for containers or other general cargo.

18. A method as set forth in claim 9, wherein
    theoretical ranges between a plurality of GPS satellites and the saved alternative locations and differences between these ranges are determined on the basis of positional data of the GPS satellites as well as positional data of the saved alternative locations; and
    the calculated theoretical ranges and differences between these ranges are compared with ranges and differences measured by the GPS device between GPS satellites and the GPS antenna (A).

* * * * *